US012654687B2

(12) United States Patent
Shimamoto et al.

(10) Patent No.: US 12,654,687 B2
(45) Date of Patent: Jun. 16, 2026

(54) CONTROL DEVICE AND CONTROL METHOD

(71) Applicant: HONDA MOTOR CO., LTD., Tokyo (JP)

(72) Inventors: Gaku Shimamoto, Tokyo (JP); Jumpei Noguchi, Tokyo (JP); Ayumu Mitomo, Tokyo (JP); Takeshi Sasajima, Tokyo (JP); Makoto Bessho, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 18/586,602

(22) Filed: Feb. 26, 2024

(65) Prior Publication Data

US 2024/0326782 A1 Oct. 3, 2024

(30) Foreign Application Priority Data

Mar. 28, 2023 (JP) ................................. 2023-052081

(51) Int. Cl.
*B60W 30/06* (2006.01)
*G05D 1/222* (2024.01)
*G05D 109/10* (2024.01)
*G05D 111/30* (2024.01)

(52) U.S. Cl.
CPC ............. *B60W 30/06* (2013.01); *G05D 1/222* (2024.01); *G05D 2109/10* (2024.01); *G05D 2111/32* (2024.01)

(58) Field of Classification Search
CPC ... B60W 30/06; G05D 1/222; G05D 2109/10; G05D 2111/32; G05D 1/221; B62D 15/0285
See application file for complete search history.

(56) References Cited

U.S. PATENT DOCUMENTS

2020/0158531 A1 5/2020 Takeuchi et al.
2022/0055659 A1* 2/2022 Zhang .................... B60K 35/28

FOREIGN PATENT DOCUMENTS

| JP | 2019-174972 A | 10/2019 |
| JP | 2020-026165 A | 2/2020 |
| JP | 2022-128263 A | 9/2022 |
| WO | WO 2018/225365 A1 | 12/2018 |

OTHER PUBLICATIONS

Aug. 20, 2024, Translation of Japanese Office Action issued for related JP Application No. 2023-052081.

* cited by examiner

*Primary Examiner* — Daryl C Pope
(74) *Attorney, Agent, or Firm* — Paratus Law Group, PLLC

(57) ABSTRACT

A control device controls a vehicle having a predetermined function. The control device is configured to obtain, via a network, data on availability of the predetermined function of the vehicle from a server that stores the data, and obtain the data, which is obtained from the server by a terminal device of a user of the vehicle, from the terminal device, and the control device comprises a control unit configured to: determine, when obtaining the data from one of the server and the terminal device fails, whether the predetermined function is available based on the data obtained from the other one of the server and the terminal device; and enable the predetermined function when it is determined that the predetermined function is available.

12 Claims, 12 Drawing Sheets

| VEHICLE ID | AVAILABILITY OF REMOTE PARKING FUNCTION | EXPIRATION DATE |
|---|---|---|
| M001 | AVAILABLE | JANUARY 31, 2023 |
| M002 | UNAVAILABLE | — |
| ⋮ | ⋮ | ⋮ |

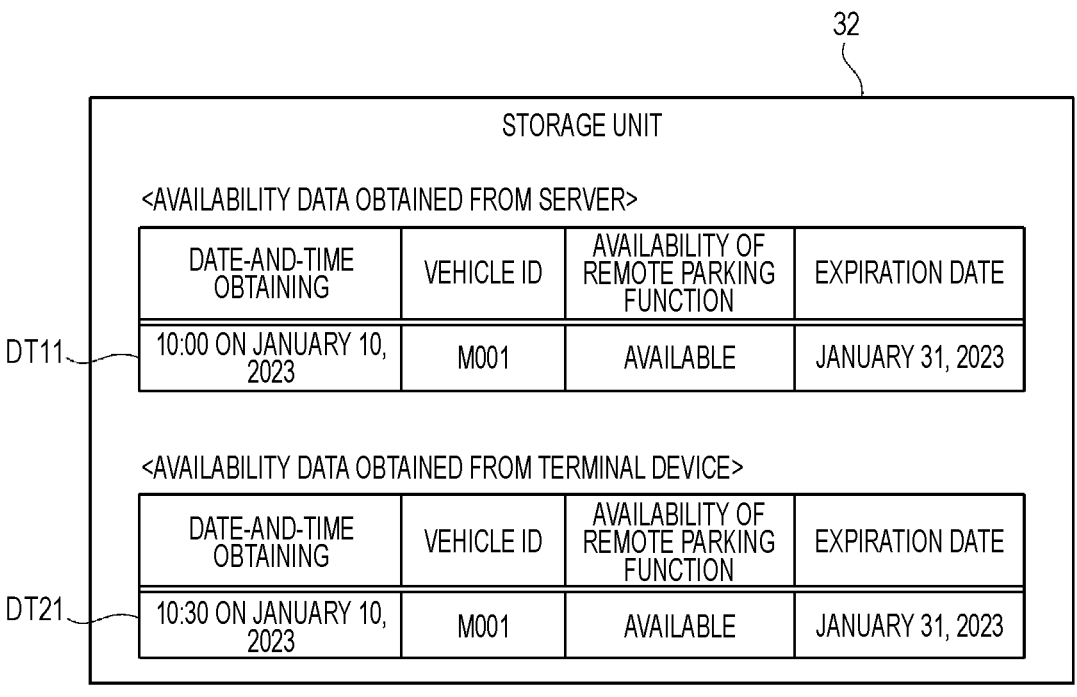

32

STORAGE UNIT

<AVAILABILITY DATA OBTAINED FROM SERVER>

| DATE-AND-TIME OBTAINING | VEHICLE ID | AVAILABILITY OF REMOTE PARKING FUNCTION | EXPIRATION DATE |
|---|---|---|---|
| 10:00 ON JANUARY 10, 2023 | M001 | AVAILABLE | JANUARY 31, 2023 |

DT11

<AVAILABILITY DATA OBTAINED FROM TERMINAL DEVICE>

| DATE-AND-TIME OBTAINING | VEHICLE ID | AVAILABILITY OF REMOTE PARKING FUNCTION | EXPIRATION DATE |
|---|---|---|---|
| 10:30 ON JANUARY 10, 2023 | M001 | AVAILABLE | JANUARY 31, 2023 |

| BETWEEN VEHICLE AND SERVER | BETWEEN VEHICLE AND TERMINAL DEVICE (BETWEEN TERMINAL DEVICE AND SERVER) | | |
| --- | --- | --- | --- |
| | AVAILABILITY DATA INDICATING AVAILABILITY IS OBTAINED | AVAILABILITY DATA INDICATING UNAVAILABILITY IS OBTAINED | FAIL TO ACQUIRE AVAILABILITY DATA (AVAILABILITY IS UNKNOWN) |
| AVAILABILITY DATA INDICATING AVAILABILITY IS OBTAINED | (a) DETERMINE AS AVAILABLE | (b) DETERMINE AS UNAVAILABLE | (c) DETERMINE AS AVAILABLE |
| AVAILABILITY DATA INDICATING UNAVAILABILITY IS OBTAINED | (d) DETERMINE AS UNAVAILABLE | (e) DETERMINE AS UNAVAILABLE | (f) DETERMINE AS UNAVAILABLE |
| FAIL TO ACQUIRE AVAILABILITY DATA (AVAILABILITY IS UNKNOWN) | (g) DETERMINE AS AVAILABLE | (h) DETERMINE AS UNAVAILABLE | (i) MAY DETERMINE AS AVAILABLE |

CONTROL DEVICE AND CONTROL METHOD

CROSS-REFERENCE RELATED APPLICATIONS

This application is based on and claims priority under 35 USC 119 from Japanese Patent Application No. 2023-052081 filed on Mar. 28, 2023, the contents of which are incorporated herein by reference.

TECHNICAL FIELD

The present disclosure relates to a control device and a control method.

BACKGROUND

In recent years, efforts have been actively made to provide access to a sustainable transportation system in consideration of vulnerable people among traffic participants.

In order to implement this object, research and development of, for example, automated driving techniques and driving assistance techniques of a moving body such as a vehicle are in progress. As one of such driving assistance techniques, for example, there is a technique in which a driver who gets off a vehicle performs a predetermined operation on a terminal device communicating with the vehicle to move the vehicle to a predetermined target position and park at the position.

Japanese Patent Application Laid-Open Publication No. 2019-174972 (hereinafter, referred to as Patent Literature 1) discloses a technique in which a vehicle-mounted device specifies a communication destination where data of a latest version is stored among the vehicle-mounted device, a portable terminal, and a server, and when the specified communication destination is other than the vehicle-mounted device, the vehicle-mounted device performs synchronization processing to update data stored in a storage area of the vehicle-mounted device to match data stored in the specified communication destination.

However, in the related art, there is room for improvement from the viewpoint of improving convenience for a user of a vehicle having a predetermined function.

The present disclosure provides a control device and a control method that can improve convenience for a user of a vehicle having a predetermined function. The present disclosure further contributes to development of a sustainable transportation system.

SUMMARY

A first aspect of the present disclosure relates to a control device that controls a vehicle having a predetermined function, in which the control device is configured to obtain, via a network, data on availability of the predetermined function of the vehicle from a server that stores the data, and obtain the data, which is obtained from the server by a terminal device of a user of the vehicle, from the terminal device, and the control device includes a control unit configured to:

determine, when obtaining the data from one of the server and the terminal device fails, whether the predetermined function is available based on the data obtained from the other one of the server and the terminal device; and enable the predetermined function when it is determined that the predetermined function is available.

A second aspect of the present disclosure relates to a control method performed by a computer that controls a vehicle having a predetermined function, in which the computer is configured to obtain, via a network, data on availability of the predetermined function of the vehicle from a server that stores the data, and obtain the data, which is obtained from the server by a terminal device of a user of the vehicle, from the terminal device, and the control method includes:

determining, when obtaining the data from one of the server and the terminal device fails, whether the predetermined function is available based on the data obtained from the other one of the server and the terminal device; and enabling the predetermined function when it is determined that the predetermined function is available.

BRIEF DESCRIPTION OF DRAWINGS

Exemplary embodiments of the present disclosure will be described in detail based on the following figures, wherein:

FIG. 2 shows an example of an availability database DB provided in a server SV communicable with the control device 30 and a terminal device T;

FIG. 4 shows an example of information stored in the control device 30;

FIG. 5 shows an example of determination by the control device 30 regarding availability of a remote parking function;

DESCRIPTION OF EMBODIMENTS

Figure 1:
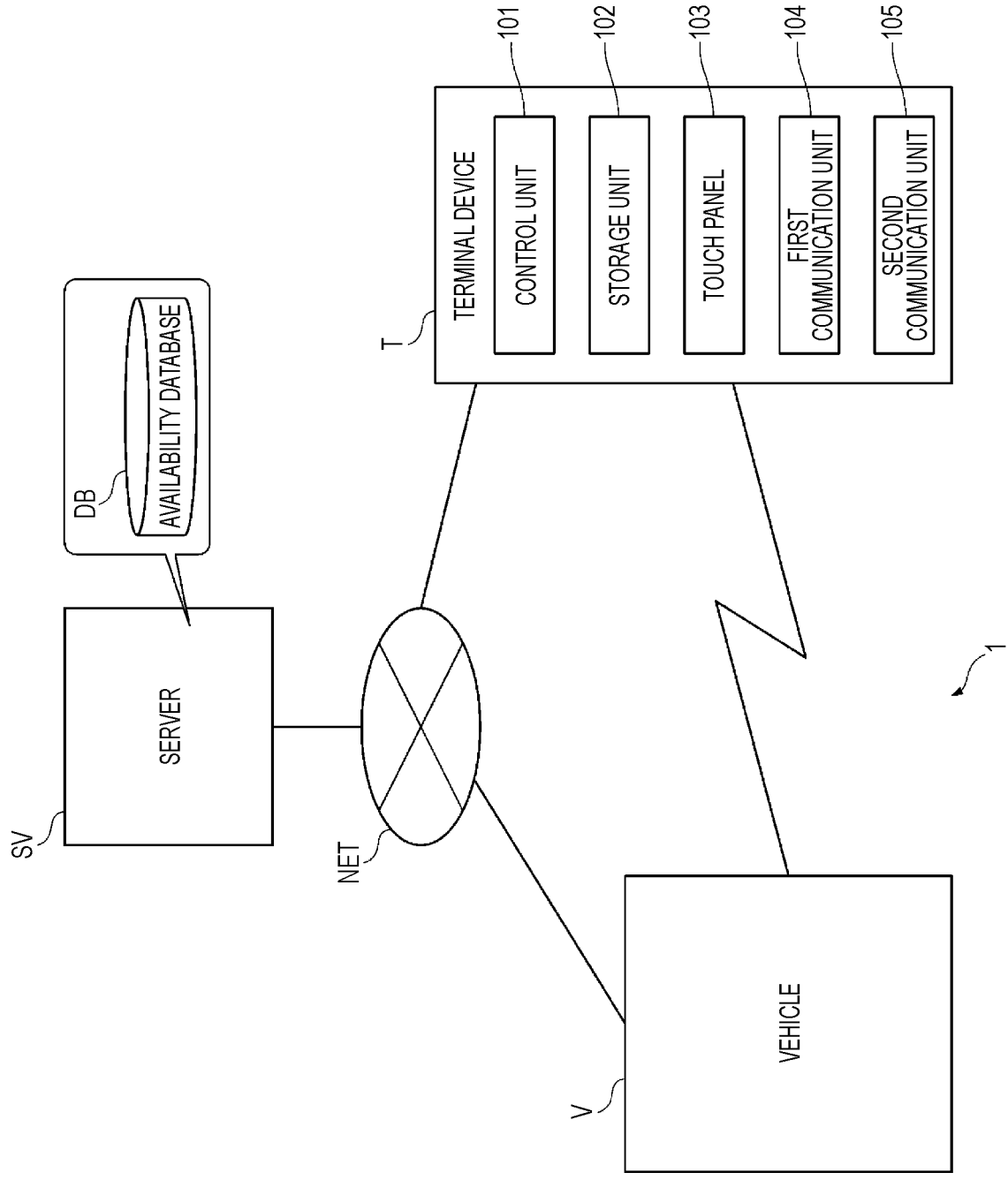
FIG. 1 shows an example of a vehicle control system 1 including a vehicle V that includes a control device 30 according to an embodiment.

An embodiment of a control device and a control method according to the present disclosure will be described in detail with reference to the drawings. The drawings are viewed in directions of reference numerals.

The following embodiment does not limit the invention described in the scope of claims, and not all combinations of features described in the embodiment are essential to the invention. Two or more of a plurality of features described in the embodiment may be combined freely. In addition, in the following description, the same or similar elements are denoted by the same or similar reference numerals, and the description thereof may be omitted or simplified as appropriate.

Vehicle Control System

A vehicle control system 1 shown in FIG. 1 includes a vehicle V and a terminal device T that can communicate with each other, and is a system in which the vehicle V that is an automobile can be moved to a predetermined position by automated steering through remote control using the terminal device T. Hereinafter, such a function of the vehicle V, that is, a function of moving to the predetermined position by automated steering according to an operation on the terminal device T, is also referred to as a "remote parking function".

Using the remote parking function, a user of the vehicle V (hereinafter, also simply referred to as a "user") can move the vehicle V to the predetermined position and park the vehicle V at the position or cause the parked vehicle V to exit (in other words, move) to the predetermined position.

In the present embodiment, the user can use the remote parking function of the vehicle V by performing a predetermined billing operation on the vehicle V or the terminal device T to make a payment to a manufacturer of the vehicle V. In other words, a highly convenient function called the remote parking function of the vehicle V is not provided to the user who does not make the payment. For example, the remote parking function may be usable by the user during a certain period (for example, one year) after a time when the user makes the payment to the manufacturer of the vehicle V (in other words, when the billing operation is performed). Further, as another example, the remote parking function may be usable by the user until the user performs a predetermined cancellation operation on the vehicle V or the terminal device T after the billing operation. In this case, during a period until the user performs the cancellation operation after the billing operation (that is, a period during which the remote parking function is available for the user), the payment along with continuation of use of the remote parking function may be made every predetermined period.

In the vehicle control system 1, the vehicle V and the terminal device T are associated with each other and can communicate with each other through predetermined short-range wireless communication. Here, the short-range wireless communication may be, for example, Bluetooth (registered trademark) or Bluetooth Low Energy (registered trademark).

In the vehicle control system 1, each of the vehicle V and the terminal device T is communicable with a server SV via a network NET. Here, the network NET may be, for example, a mobile communication network, the Internet, a wide area network (WAN), or a local area network (LAN) including Wi-Fi (registered trademark).

Server

The server SV is, for example, a computer that is managed by the manufacturer of the vehicle V and stores availability data on availability of the remote parking function of the vehicle V. In other words, the server SV is a computer that manages availability of the remote parking function of the vehicle V.

FIG. 1 shows an example in which one set of the vehicle V and the terminal device T is provided relative to the server SV, but two or more sets of the vehicle V and the terminal device T may be provided relative to the server SV. In this case, the server SV manages the availability of the remote parking function of each vehicle V by storing the availability data on the availability of the remote parking function of each vehicle V.

Specifically, the server SV includes, for example, an availability database DB. As shown in FIG. 2, the availability database DB stores the availability data (for example, availability data DT1 in FIG. 2) as a record.

Here, the availability data is, for example, data in which information indicating a vehicle ID, which is an identifier for identifying each vehicle V, and information indicating the availability of the remote parking function of the vehicle V identified through the vehicle ID are associated with each other. As an example, the availability data DT1 shown in FIG. 2 indicates that the remote parking function is available for the vehicle V whose vehicle ID is "M001".

As shown in FIG. 2, the availability data may include information indicating an expiration date by which the remote parking function is available, in instead of or in addition to the information indicating the availability of the remote parking function.

For example, the server SV stores, based on the billing operation of the user on the vehicle V or the terminal device T, the availability data including information indicating that the remote parking function is available for the vehicle V.

For example, when the user of the vehicle V having the vehicle ID "M001" performs the billing operation on the vehicle V or the terminal device T associated with the vehicle V, information indicating receipt of the billing operation related to the vehicle V having the vehicle ID "M001" is transmitted to the server SV. In this way, when the information indicating the receipt of the billing operation related to the vehicle V having the vehicle ID "M001" is received, the server SV stores, in the availability database DB, the availability data indicating that the remote parking function is available for the vehicle V having the vehicle ID "M001", like the availability data DT1 shown in FIG. 2.

The server SV is configured to transmit the availability data to the vehicle V and the terminal device T. More specifically, when an obtaining request for the availability data is received from the vehicle V or the terminal device T associated with the vehicle V, the server SV searches the availability database DB for the availability data corresponding to the vehicle V and transmits the retrieved availability data to a transmission source of the obtaining request.

As an example, the vehicle V having the vehicle ID "M001" and the terminal device T associated with the vehicle V may each transmit an obtaining request for the availability data including information indicating the vehicle ID "M001" to the server SV at a predetermined timing. When the obtaining request for the availability data including the information indicating the vehicle ID "M001" is received, the server SV searches the availability database DB for the availability data including the information indicating the vehicle ID "M001". When the availability data including the information indicating the vehicle ID "M001" is retrieved from the availability database DB, the server SV transmits the availability data to a transmission source of the obtaining request.

Therefore, when the vehicle V and the terminal device T can communicate with the server SV, the availability data can be obtained from the server SV. On the other hand, when the vehicle V and the terminal device T cannot communicate with the server SV for any reason such as being unable to connect to the network NET, the availability data cannot be obtained from the server SV.

Here, the availability data stored in the server SV includes the vehicle ID that is the identifier of the vehicle V, but is not limited thereto. For example, instead of or in addition to the vehicle ID, the availability data may include information indicating a user ID that is an identifier of the user of the vehicle V or a terminal device ID that is an identifier of the terminal device T associated with the vehicle V.

The server SV may be a virtual server (so-called cloud server) implemented in cloud computing service, or may be a physical server implemented as one device.

Terminal Device

The terminal device T is a portable computer used by the user of the vehicle V, and may be, for example, a smartphone, a tablet terminal, or a wearable terminal. In the following description, it is assumed that the terminal device T is a smartphone.

As shown in FIG. 1, the terminal device T includes, for example, a control unit 101, a storage unit 102, a touch panel 103, a first communication unit 104, and a second communication unit 105.

The control unit 101 functions as a calculation processing device and a control device, and integrally controls the entire terminal device T according to various programs stored in the storage unit 102 or the like. The control unit 101 is implemented by, for example, a central processing unit (CPU) or an electronic circuit such as a microprocessor.

The storage unit 102 includes a non-volatile storage medium such as a flash memory, and stores various types of information (for example, data and programs) for controlling an operation of the terminal device T. As an example, the storage unit 102 stores a "remote parking application" that is an application program for executing processing related to the remote parking function (for example, processing shown in FIG. 7).

The touch panel 103 functions as an input device that receives input of various types of information to the terminal device T and as a display device controlled by the control unit 101. That is, the user can input various commands to the terminal device T via the touch panel 103. Various screens are displayed on the touch panel 103.

The first communication unit 104 is an interface that is connected to the network NET and controls input and output of data between the terminal device T and the outside (for example, the server SV) via the network NET. The first communication unit 104 is controlled by the control unit 101.

The second communication unit 105 is an interface that controls input and output of data between the terminal device T and the outside (for example, the vehicle V) via predetermined short-range wireless communication. The second communication unit 105 is controlled by the control unit 101.

For example, when a remote parking application launch command is received from the user via the touch panel 103, the terminal device T launches the remote parking application. When the remote parking application is launched, the terminal device T obtains the availability data from the server SV via the first communication unit 104 and the network NET.

When obtaining the availability data, the terminal device T transmits, to the server SV via the first communication unit 104, the obtaining request for the availability data including the information indicating the vehicle ID of the vehicle V associated with the terminal device T, for example. Then the terminal device T obtains the availability data, which is transmitted from the server SV as a response to the obtaining request and received by the first communication unit 104.

When the availability data is obtained from the server SV, the terminal device T transmits the obtained availability data to the vehicle V via the second communication unit 105 and the short-range wireless communication. For example, at this time, the terminal device T associates the availability data obtained from the server SV with information indicating date-and-time when the availability data is obtained (date-and-time of obtaining), and transmits the data to the vehicle V. In this way, the vehicle V can specify when the availability data received from the terminal device T is obtained from the server SV.

When the terminal device T cannot communicate with the server SV for any reason and fails to obtain the availability data from the server SV, for example, the terminal device T transmits information indicating that obtaining the availability data fails to the vehicle 2 and notifies the vehicle V of the failure to obtain the availability data. In this case, the vehicle V fails to obtain the availability data from the terminal device T.

[Vehicle]

The vehicle V is an automobile including a drive source, and wheels (all not shown) including drive wheels driven by power of the drive source and steering wheels that are steerable. For example, the vehicle V is a four-wheeled automobile including a pair of left and right front wheels and a pair of left and right rear wheels. The drive source of the vehicle V may be an electric motor, an internal combustion engine such as a gasoline engine or a diesel engine, or a combination of an electric motor and an internal combustion engine. The drive source of the vehicle V may drive the pair of left and right front wheels, the pair of left and right rear wheels, or the four wheels including the pair of left and right front wheels and the pair of left and right rear wheels. Either the front wheels or the rear wheels may be steering wheels that are steerable, or the front wheels and the rear wheels may both be steering wheels that are steerable.

Figure 3:
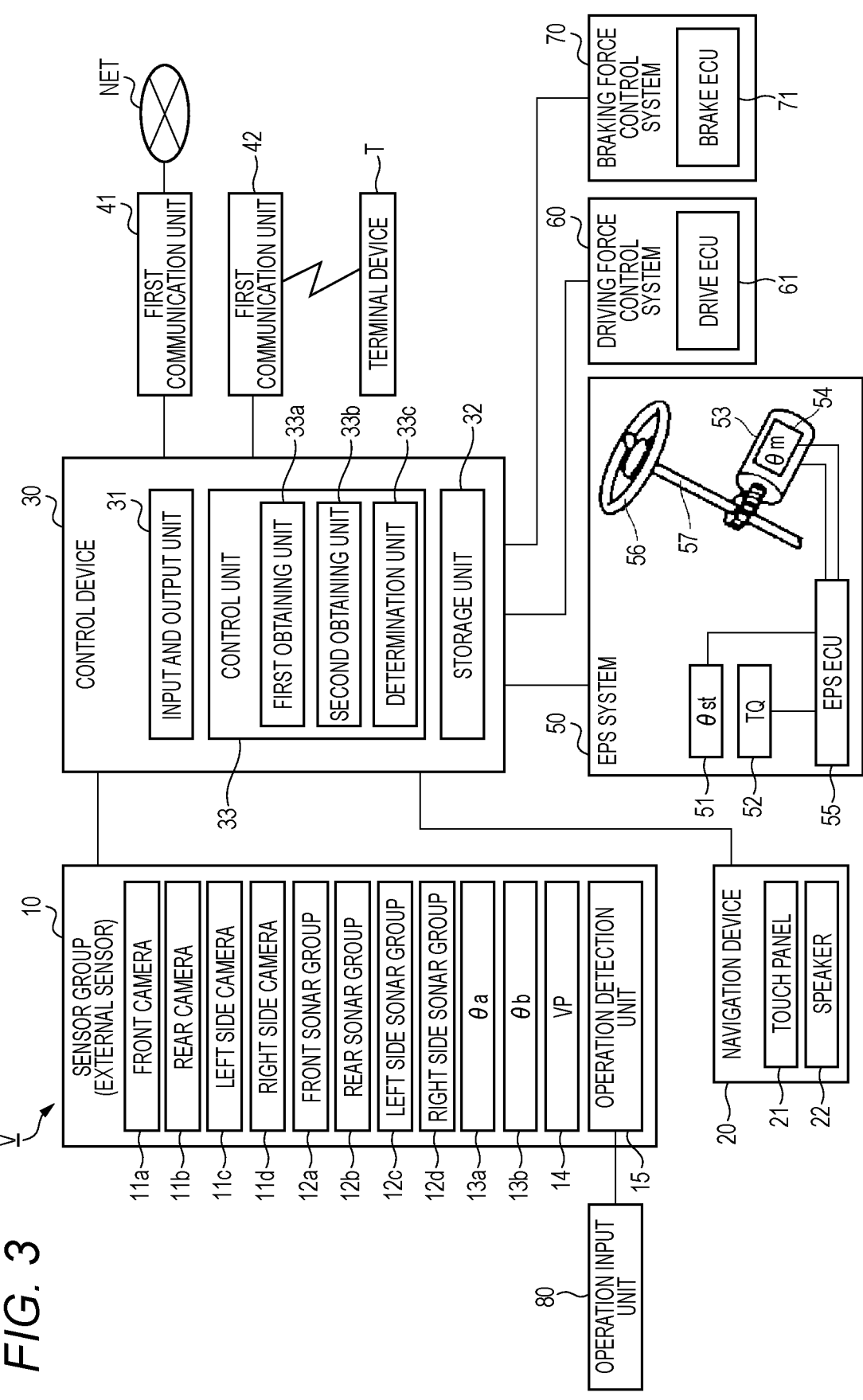
FIG. 3 shows an example of the vehicle V.

As shown in FIG. 3, the vehicle V includes, for example, a sensor group 10, a navigation device 20, a control device 30, a first communication unit 41, a second communication unit 42, an electric power steering (EPS) system 50, a driving force control system 60, and a braking force control system 70.

The sensor group 10 obtains various detection values related to the vehicle V or a periphery of the vehicle V. The sensor group 10 includes, for example, a front camera 11$a$, a rear camera 11$b$, a left side camera 11$c$, a right side camera 11$d$, a front sonar group 12$a$, a rear sonar group 12$b$, a left side sonar group 12$c$, and a right side sonar group 12$d$. These cameras and sonar groups may function as external sensors that obtain peripheral information of the vehicle V.

The front camera 11$a$, the rear camera 11$b$, the left side camera 11$c$, and the right side camera 11$d$ output, to the control device 30, image data of peripheral images obtained by capturing images of the periphery of the vehicle V. The peripheral images captured by the front camera 11$a$, the rear camera 11$b$, the left side camera 11$c$, and the right side camera 11$d$ are also referred to as a front image, a rear image, a left side image, and a right side image, respectively. An image formed by the left side image and the right side image is also referred to as a side image.

The front sonar group 12$a$, the rear sonar group 12$b$, the left side sonar group 12$c$, and the right side sonar group 12$d$ emit sound waves to the periphery of the vehicle V and receive reflected sounds from other objects. The front sonar group 12$a$ includes, for example, four sonars. The sonars constituting the front sonar group 12$a$ are respectively provided on an obliquely left front side, a front left side, a front right side, and an obliquely right front side of the vehicle V. The rear sonar group 12$b$ includes, for example, four sonars. The sonars constituting the rear sonar group 12$b$ are respectively provided on an obliquely left rear side, a rear left side, a rear right side, and an obliquely right rear side of the vehicle V. The left side sonar group 12c includes, for example, two sonars. The sonars constituting the left side sonar group 12c are respectively provided in the front of a left side and in the rear of the left side of the vehicle V. The right side sonar group 12d includes, for example, two sonars. The sonars constituting the right side sonar group 12d are respectively provided in the front of a right side and in the rear of the right side of the vehicle V.

Further, the sensor group 10 includes wheel sensors 13a and 13b, a vehicle speed sensor 14, and an operation detection unit 15. The wheel sensors 13a and 13b detect rotation angles of the wheels (not shown), respectively. The wheel sensors 13a and 13b may be implemented by angle sensors or may be implemented by displacement sensors. The wheel sensors 13a and 13b output detection pulses each time the wheels rotate at a predetermined angle. The detection pulses output from the wheel sensors 13a and 13b may be used to calculate the rotation angles and rotation speeds of the wheels. A movement distance of the vehicle V can be calculated based on the rotation angles of the wheels. The wheel sensor 13a detects, for example, a rotation angle θa of a left rear wheel. The wheel sensor 13b detects, for example, a rotation angle θb of a right rear wheel.

The vehicle speed sensor 14 detects a vehicle speed VP that is a travel speed of the vehicle V, and outputs the detected vehicle speed VP to the control device 30. The vehicle speed sensor 14 detects the vehicle speed VP based on, for example, rotation of a countershaft of a transmission.

The operation detection unit 15 detects an operation performed by the user using an operation input unit 80 and outputs the detected operation to the control device 30. The operation input unit 80 and a touch panel 21 to be described later may be made common. The operation input unit 80 may include a shift lever that switches between forward movement, reverse movement, and parking of the vehicle V. An example of the operation performed by the user using the operation input unit 80 is an operation to execute parking using the remote parking function.

The navigation device 20, for example, specifies a current position of the vehicle V using a global positioning system (GPS) and guides the user along a route from the specified current position to a destination set by the user.

The navigation device 20 includes a storage device (not shown) that stores a map information database.

The navigation device 20 includes, for example, the touch panel 21 and a speaker 22. The touch panel 21 functions as an input device that receives input of various types of information to the control device 30 and as a display device controlled by the control device 30. That is, the user can input various commands to the control device 30 via the touch panel 21. Various screens (for example, a screen for guiding the route to the destination) may be displayed on the touch panel 21.

The speaker 22 outputs various types of guidance information to the user by a sound. As an example, before movement of the vehicle V by the remote parking function is started, sound guidance of the start of the movement of the vehicle V may be performed via the speaker 22.

The first communication unit 41 is an interface that is connected to the network NET and controls input and output of data between the vehicle V and the outside (for example, the server SV) via the network NET. The first communication unit 41 is controlled by the control device 30.

The second communication unit 42 is an interface that controls input and output of data between the vehicle V and the outside (for example, the terminal device T) via predetermined short-range wireless communication. The second communication unit 42 is controlled by the control device 30.

The EPS system 50 includes a steering angle sensor 51, a torque sensor 52, an EPS motor 53, a resolver 54, and an EPS electronic control unit (ECU) 55. The steering angle sensor 51 detects a steering angle θst of a steering 56. The torque sensor 52 detects a torque TQ applied to the steering 56.

The EPS motor 53 applies a driving force or a reaction force to a steering column 57 connected to the steering 56, thereby enabling assistance of an operation performed by a driver on the steering 56 and enabling automated steering during automated parking. The resolver 54 detects a rotation angle θm of the EPS motor 53. The EPS ECU 55 controls the entire EPS system 50. The EPS ECU 55 includes an input and output unit, a calculation unit, and a storage unit (all not shown).

The driving force control system 60 includes a drive ECU 61. The drive ECU 61 controls a driving force of the vehicle V by controlling the drive source of the vehicle V according to an operation of the user on an accelerator pedal (not shown) and/or an instruction from the control device 30.

The braking force control system 70 includes a brake ECU 71. The brake ECU 71 controls a braking force of the vehicle V by controlling a brake mechanism (in other words, a brake device) of the vehicle V according to an operation of the user on a brake pedal (not shown) and/or an instruction from the control device 30.

Control Device

The control device 30 is an example of a control device according to the present disclosure and is a computer that integrally controls the entire vehicle V. For example, the control device 30 may be implemented by one ECU or may be implemented by cooperation of a plurality of ECUs.

As shown in FIG. 3, the control device 30 includes, for example, an input and output unit 31, a storage unit 32, and a control unit 33. The input and output unit 31 is an interface that inputs and outputs data (information) between the inside and the outside of the control device 30 under control of the control unit 33. The storage unit 32 includes a non-volatile storage medium, such as a flash memory, and stores various types of information (for example, data and programs) for controlling an operation of the vehicle V.

The control unit 33 functions as a calculation processing device and a control device, and integrally controls the entire vehicle V according to various programs stored in the storage unit 32 or the like. The control unit 33 is implemented by, for example, a CPU or an electronic circuit such as a microprocessor.

The control unit 33 includes, for example, a first obtaining unit 33a, a second obtaining unit 33b, and a determination unit 33c as functional units implemented by a processor, such as the CPU implementing the control unit 33, by executing a program stored in the storage unit 32 or the like.

The first obtaining unit 33a obtains the availability data from the server SV via the first communication unit 41 and the network NET at a predetermined timing. As an example, the first obtaining unit 33a obtains the availability data from the server SV at a timing when an ignition power supply of the vehicle V is turned on. The timing when the first obtaining unit 33a obtains the availability data from the server SV is not limited thereto, and may be set as desired by the manufacturer of the vehicle V, for example.

When obtaining the availability data, the first obtaining unit 33a transmits, to the server SV via the first communication unit 41, the obtaining request for the availability data including the information indicating the vehicle ID of the vehicle V, for example. The first obtaining unit 33a obtains the availability data, which is transmitted from the server SV as a response to the obtaining request and received by the first communication unit 41. When the availability data is obtained from the server SV, the first obtaining unit 33a stores the availability data in the storage unit 32.

The second obtaining unit 33b obtains the availability data received by the second communication unit 42 from the terminal device T via short-range wireless communication. When the availability data is obtained from the terminal device T, the second obtaining unit 33b stores the availability data in the storage unit 32. As an example, at this time, the second obtaining unit 33b stores the availability data obtained from the terminal device T in a manner distinguishable from the availability data obtained from the server SV by the first obtaining unit 33a.

Here, an example of the availability data stored in the control device 30 will be described. As shown in FIG. 4, for example, the control device 30 stores, in the storage unit 32, a predetermined number of pieces of availability data obtained most recently by the first obtaining unit 33a from the server SV and a predetermined number of pieces of availability data obtained most recently by the second obtaining unit 33b from the terminal device T in a manner distinguishable from each other.

The control device 30 stores information indicating date-and-time when the availability data is obtained (date-and-time of obtaining) in association with each piece of availability data. For example, the control device 30 stores the availability data obtained from the server SV in association with information indicating date-and-time when the control device 30 obtains the availability data from the server SV. The control device 30 stores the availability data obtained from the terminal device T in association with information indicating date-and-time when the terminal device T obtains the availability data from the server SV. As an example, as described above, the availability data transmitted from the terminal device T to the vehicle V is associated with the information indicating the date-and-time when the terminal device T obtains the availability data from the server SV, and thus the control device 30 may store the availability data and the date-and-time in association with each other in the storage unit 32.

In the example shown in FIG. 4, availability data DT11 is stored in the storage unit 32 as the availability data obtained from the server SV. Here, the availability data DT11 is the availability data obtained most recently from the server SV. Availability data DT21 is stored in the storage unit 32 as the availability data obtained from the terminal device T. Here, the availability data DT21 is the availability data obtained most recently from the terminal device T.

Here, among the availability data obtained from the server SV and the availability data obtained from the terminal device T, only the most recently obtained availability data is stored (in other words, retained), but the present disclosure is not limited thereto. For example, two or more pieces of availability data obtained from the server SV and two or more pieces of availability data obtained from the terminal device T may be stored. A degree to which the availability data is to be stored in the storage unit 32 may be set as desired by the manufacturer of the vehicle V in consideration of a storage capacity of the storage unit 32 or the like.

Referring back to FIG. 3, the determination unit 33c determines whether the remote parking function is available in the vehicle V based on the availability data obtained from at least one of the server SV and the terminal device T. When the determination unit 33c determines that the remote parking function is available, the control unit 33 enables the remote parking function of the vehicle V and makes the function available for the user. On the other hand, when the determination unit 33c determines that the remote parking function is unavailable, the control unit 33 does not enable the remote parking function of the vehicle V and prevents the function from being used by the user.

In the present embodiment, as shown in a table TB in FIG. 5, regarding a relationship between the vehicle V and the server SV, a case where the availability data obtained by the vehicle V from the server SV indicates that the remote parking function is available in the vehicle V (hereinafter, also simply referred to as "availability") and a case where the availability data indicates that the remote parking function is unavailable in the vehicle V (hereinafter, also simply referred to as "unavailability") are conceivable. Further, a case where the vehicle V fails to obtain the availability data from the server SV is also conceivable.

Regarding a relationship between the vehicle V and the terminal device T, a case where the availability data obtained by the vehicle V from the terminal device T (in other words, the availability data obtained by the terminal device T from the server SV) indicates availability and a case where the availability data indicates unavailability are conceivable. Further, a case where the vehicle V fails to obtain the availability data from the terminal device T (in other words, the terminal device T fails to obtain the availability data from the server SV) is conceivable.

Therefore, in the present embodiment, the following nine cases may occur based on combinations of the above three cases regarding the relationship between the vehicle V and the server SV and the above three cases regarding the relationship between the vehicle V and the terminal device T.

A first case is a case where the availability data obtained from the server SV indicates availability, and the availability data obtained from the terminal device T indicates availability. As shown in (a) in the table TB in FIG. 5, in this case, the determination unit 33c determines that the remote parking function is available.

A second case is a case where the availability data obtained from the server SV indicates availability, and the availability data obtained from the terminal device T indicates unavailability. Since the vehicle V and the terminal device T may obtain the availability data from the server SV at different timings, such a case may occur. As shown in (b) in the table TB in FIG. 5, in this case, the determination unit 33c determines that the remote parking function is unavailable.

A third case is a case where the availability data obtained from the server SV indicates availability, and obtaining the availability data from the terminal device T fails. As shown in (c) in the table TB in FIG. 5, in this case, the determination unit 33c determines that the remote parking function is available.

A fourth case is a case where the availability data obtained from the server SV indicates unavailability, and the availability data obtained from the terminal device T indicates availability. As described above, since the vehicle V and the terminal device T may obtain the availability data from the server SV at different timings, such a case may occur. As shown in (d) in the table TB in FIG. 5, in this case, the determination unit 33c determines that the remote parking function is unavailable.

A fifth case is a case where the availability data obtained from the server SV indicates unavailability, and the availability data obtained from the terminal device T indicates unavailability. As shown in (c) in the table TB in FIG. 5, in this case, the determination unit 33*c* determines that the remote parking function is unavailable.

A sixth case is a case where the availability data obtained from the server SV indicates unavailability, and obtaining the availability data from the terminal device T fails. As shown in (f) in the table TB in FIG. 5, in this case, the determination unit 33*c* determines that the remote parking function is unavailable.

A seventh case is a case where obtaining the availability data from the server SV fails, and the availability data obtained from the terminal device T indicates availability. As shown in (g) in the table TB in FIG. 5, in this case, the determination unit 33*c* determines that the remote parking function is available.

An eighth case is a case where obtaining the availability data from the server SV fails, and the availability data obtained from the terminal device T indicates unavailability. As shown in (h) in the table TB in FIG. 5, in this case, the determination unit 33*c* determines that the remote parking function is unavailable.

A ninth case is a case where obtaining the availability data from the server SV fails, and obtaining the availability data from the terminal device T fails. As shown in (i) in the table TB in FIG. 5, in this case, the determination unit 33*c* may determine that the remote parking function is available.

More specifically, when obtaining the availability data from both the server SV and the terminal device T fails, the determination unit 33*c* determines whether the remote parking function is available based on the availability data obtained from the server SV or the terminal device T in a past time.

As an example, in this case, the determination unit 33*c* refers to the storage unit 32 and determines whether the availability data obtained from the server SV or the terminal device T in the past time indicates availability. When the availability data obtained from the server SV or the terminal device T in the past time indicates availability, the determination unit 33*c* determines that the remote parking function is available. On the other hand, when the availability data obtained from the server SV or the terminal device T in the past time does not indicate availability, the determination unit 33*c* determines that the remote parking function is unavailable.

As another example, in this case, the determination unit 33*c* may determine whether the remote parking function is available based on the availability data obtained from the server SV or the terminal device T in a predetermined period from a current time to the past time. More specifically, in this case, the determination unit 33*c* may refer to the storage unit 32 and determine that the remote parking function is available if the availability data obtained from the server SV or the terminal device T in a period from the current time to one month before indicates availability. On the other hand, the determination unit 33*c* may determine that the remote parking function is unavailable if the availability data obtained from the server SV or the terminal device T in the period from the current time to one month before does not indicate availability.

Here, an example in which the predetermined period is one month is described, but the period is not limited thereto. A length of the predetermined period may be set as desired by the manufacturer of the vehicle V. For example, the determination unit 33*c* can specify the availability data obtained within the predetermined period from the current time to the past time by referring to information on the date-and-time of obtaining associated with each piece of availability data in the storage unit 32.

When obtaining the availability data from both the server SV and the terminal device T fails, the determination unit 33*c* may determine whether the remote parking function is available based on the availability data obtained most recently among the availability data obtained from the server SV in the past time and the availability data obtained from the terminal device T in the past time. More specifically, in this case, the determination unit 33*c* may refer to the storage unit 32 and determine that the remote parking function is available if the availability data whose date-and-time of obtaining is later in time series (in other words, the availability data associated with the date-and-time of obtaining later in time series), among the availability data obtained from the server SV in the past time and the availability data obtained from the terminal device T in the past time, indicates availability. On the other hand, the determination unit 33*c* may determine that the remote parking function is unavailable. if the availability data associated with the date-and-time of obtaining later in time series indicates unavailability.

As described above, the control device 30 (the control unit 33) determines that the remote parking function is available when the availability data can be obtained from both the server SV and the terminal device T whereas the availability data obtained from both the server SV and the terminal device T indicates availability (see (a) in the table TB in FIG. 5). In this case, the control device 30 enables the remote parking function and makes the function available for the user.

That is, when the availability data can be obtained from both the server SV and the terminal device T whereas the availability data obtained from both the server SV and the terminal device T indicates availability, there is an extremely high possibility that the user is authorized to use the remote parking function at the current time. Therefore, in this case, it is considered reasonable to provide the remote parking function to the user. Therefore, in this case, the control device 30 enables the remote parking function of the vehicle V. Accordingly, the user for whom the remote parking function of the vehicle V is originally available can use the function, and thus convenience for the user is improved.

When the availability data can be obtained from both the server SV and the terminal device T whereas at least one piece of the availability data obtained from the server SV and the terminal device T indicates unavailability, the control device 30 determines that the remote parking function is unavailable (see (b), (d), and (c) in the table TB in FIG. 5). In this case, the control device 30 does not enable the remote parking function, and the user cannot use the function.

That is, when the availability data can be obtained from both the server SV and the terminal device T whereas at least one piece of the availability data obtained from the server SV and the terminal device T indicates unavailability, there is a possibility that the user is not authorized to use the remote parking function at the current time. Therefore, in this case, it is considered reasonable not to provide the remote parking function to the user. Therefore, in this case, the control device 30 does not enable the remote parking function of the vehicle V. Accordingly, it is possible to prevent the remote parking function of the vehicle V from being erroneously provided to the user who is not authorized to use the function.

In the example described here, when the availability data can be obtained from both the server SV and the terminal device T whereas at least one piece of the availability data obtained from the server SV and the terminal device T indicates unavailability, the remote parking function is not provided to the user, but the disclosure is not limited thereto. For example, in this case, the control device 30 may determine that the remote parking function is available and provide the function to the user if the availability data whose date-and-time of obtaining is later in time series among the availability data obtained from both the server SV and the terminal device T indicates availability. In this way, when there is a high possibility that the user is authorized to use the remote parking function at the current time, the remote parking function of the vehicle V is enabled, the user can use the function, and thus the convenience for the user is improved.

When the availability data can be obtained from only one of the server SV and the terminal device T whereas the availability data indicates availability, the control device 30 determines that the remote parking function is available (see (c) and (g) in the table TB in FIG. 5). In this case, the control device 30 enables the remote parking function and makes the function available for the user.

That is, when the availability data can be obtained from one of the server SV and the terminal device T whereas the availability data indicates availability, there is a high possibility that the user is authorized to use the remote parking function at the current time. Therefore, in this case, it is considered reasonable to provide the remote parking function to the user. Therefore, in this case, the control device 30 enables the remote parking function of the vehicle V. Accordingly, it is possible to prevent the remote parking function of the vehicle V from being unusable by the user for whom the function is originally available due to failure to obtain the availability data from one of the server SV and the terminal device T, and thus the convenience for the user is improved.

When the availability data can be obtained from only one of the server SV and the terminal device T whereas the availability data indicates unavailability, the control device 30 determines that the remote parking function is unavailable (see (f) and (h) in the table TB in FIG. 5). In this case, the control device 30 does not enable the remote parking function, and the user cannot use the function.

That is, when the availability data can be obtained from only one of the server SV and the terminal device T whereas the availability data indicates unavailability, there is a possibility that the user is not authorized to use the remote parking function at the current time. Therefore, in this case, it is considered reasonable not to provide the remote parking function to the user. Therefore, in this case, the control device 30 does not enable the remote parking function of the vehicle V. Accordingly, it is possible to prevent the remote parking function of the vehicle V from being erroneously provided to the user who is not authorized to use the function.

When obtaining the availability data from both the server SV and the terminal device T fails, the control device 30 determines whether the remote parking function is available based on the availability data obtained from the server SV or the terminal device T in the past time. For example, if the availability data obtained from the server SV or the terminal device T in the past time indicates availability, the control device 30 determines that the remote parking function is available (see (i) in the table TB in FIG. 5), enables the function, thereby making the function available for the user.

That is, when the availability data obtained from the server SV or the terminal device T in the past time indicates availability, there is a possibility that the user is authorized to use the remote parking function at the current time. Therefore, in this case, the control device 30 enables the remote parking function of the vehicle V. Accordingly, even when obtaining the availability data from both the server SV and the terminal device T fails, it is possible to prevent the remote parking function of the vehicle V from being unusable by the user for whom the function is originally available, and thus the convenience for the user is improved.

On the other hand, if the availability data obtained from the server SV or the terminal device T in the past time does not indicate availability, the control device 30 determines that the remote parking function is unavailable and does not provide the function to the user. That is, when the availability data obtained from the server SV or the terminal device T in the past time does not indicate availability, there is a high possibility that the user is not authorized to use the remote parking function at the current time. Therefore, in this case, the control device 30 does not enable the remote parking function of the vehicle V. Accordingly, even when obtaining the availability data from both the server SV and the terminal device T fails, it is possible to prevent the remote parking function of the vehicle V from being erroneously provided to the user who is not authorized to use the function.

When obtaining the availability data from at least one of the server SV and the terminal device T fails, the control device 30 may once determine the availability of the remote parking function as described above and then retry obtaining the availability data at a predetermined cycle (for example, every 10 [s]). When the availability data can be obtained by retry, the control device 30 may re-determine the availability of the remote parking function based on the newly obtained availability data.

For example, even when the availability data obtained from the server SV or the terminal device T in the past time indicates availability, it is conceivable that the user may not be authorized to use the remote parking function at the current time. Therefore, when obtaining the availability data from at least one of the server SV and the terminal device T fails, it is preferable that the control device 30 retries obtaining the availability data and re-determines the availability of the remote parking function based on the availability data newly obtained by the retry.

For example, in a case where the availability data newly obtained when the remote parking function is enabled indicates unavailability, it is preferable that the control device 30 disables the remote parking function. Accordingly, it is possible to prevent the remote parking function of the vehicle V from continuing to be erroneously provided to the user who is not authorized to use the function.

Remote Parking Function

Next, an example of the remote parking function of the vehicle V will be described more specifically. As described above, by using the remote parking function of the vehicle V, the user can move the vehicle V to the predetermined position and park the vehicle V at the position or cause the parked vehicle V to exit to the predetermined position.

Parking by Remote Parking Function

In a case where parking is performed by the remote parking function, for example, when an operation to execute parking by the remote parking function is received through the operation input unit 80 or the like, the control device 30 of the vehicle V detects, based on a detection result of the sensor group 10, an available parking position where the vehicle V can be parked. Then, the control device 30 sets the detected available parking position as a target position (hereinafter also referred to as a "target parking position").

When a plurality of available parking positions are detected, the control device 30 sets one of the available parking positions as the target parking position.

Thereafter, the control device 30 moves the vehicle V to the target parking position by controlling an operation of each unit of the vehicle V based on a movement instruction from the terminal device T. The movement instruction is transmitted from the terminal device T to the vehicle V when the user performs a predetermined operation on the touch panel 103 of the terminal device T where the remote parking application is executed, for example.

Figure 6:
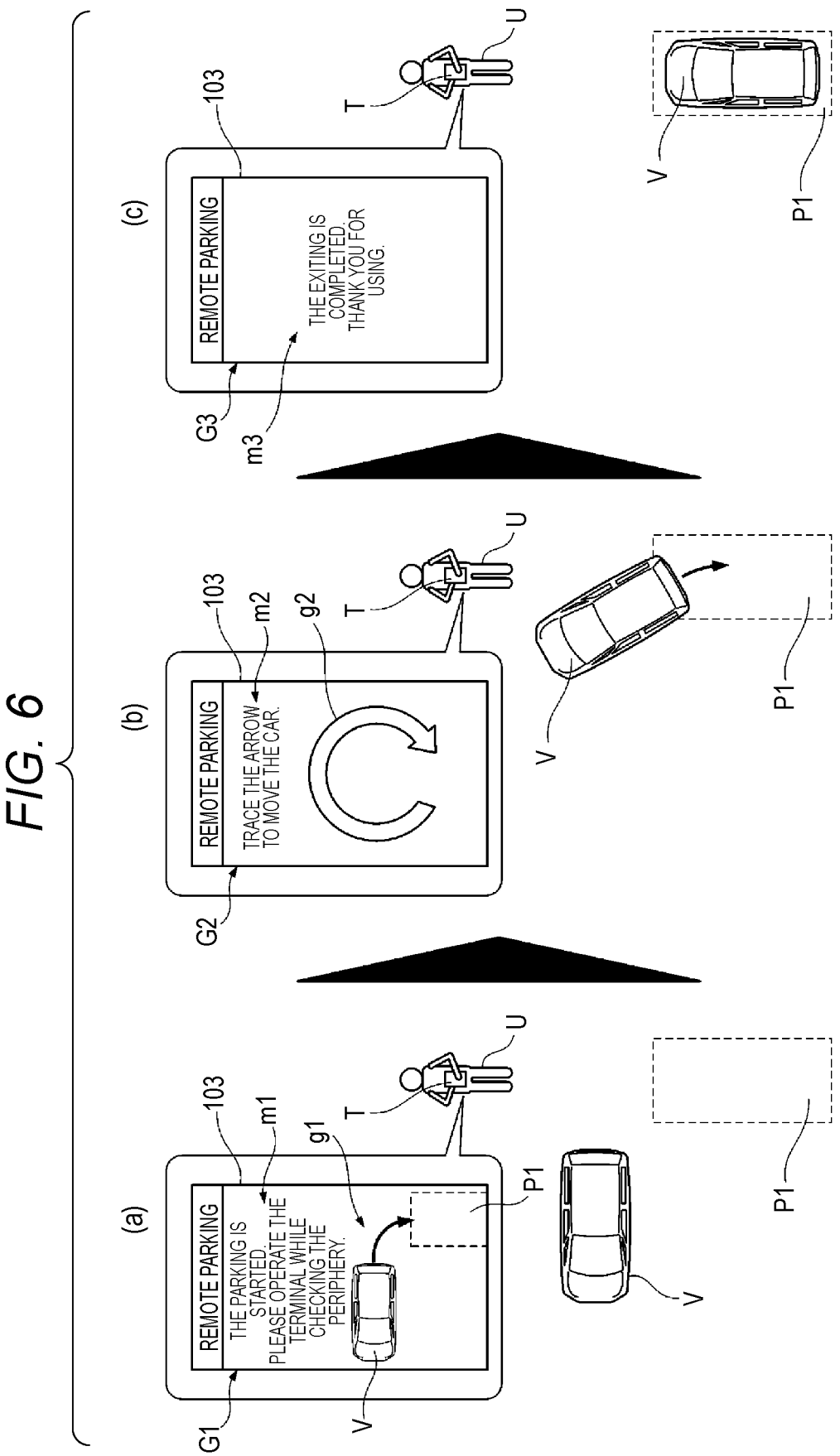
FIG. 6 shows an example of parking using the remote parking function.

More specifically, as shown in (a) in FIG. 6, when an operation to execute parking by the remote parking function is received from a user U, the control device 30 detects an available parking position P1 where the vehicle V can be parked and sets the detected available parking position P1 as the target parking position. When setting the target parking position, the control device 30 transmits, to the terminal device T, information including a position of the target parking position and contents of movement toward the target parking position (for example, along which trajectory the movement is to be performed to park at the target parking position).

The terminal device T displays on the touch panel 103, for example, an operation start screen G1 based on the information received from the vehicle V. The operation start screen G1 displays an image g1 indicating a positional relationship between the vehicle V and the target parking position (here, the available parking position P1) and a trajectory when the vehicle V moves to the target parking position, and a message m1 prompting attention to a peripheral situation.

When the user U performs a predetermined operation (for example, a touch operation) on the touch panel 103 on which the operation start screen G1 is displayed, an operation reception screen G2 is displayed on the touch panel 103 as shown in (b) in FIG. 6. On the operation reception screen G2, for example, an arc-shaped arrow image g2 is displayed in a large size at the center of the screen, and a message m2 that guides an operation for moving the vehicle V (hereinafter, also referred to as a "movement operation") is displayed beside (above in this example) the arrow image g2.

The arrow image g2 indicates a position and a direction that the user U is to trace with a fingertip. In the present embodiment, an operation of tracing the position indicated by the arrow image g2 with the fingertip in the direction indicated by the arrow image g2 is the movement operation. Therefore, as the message m2, a message "trace the arrow to move the car" is displayed.

By displaying such an operation reception screen G2 on the terminal device T, it is possible to guide the user U through the movement operation in an intuitive and easy-to-understand manner. When there is an operation of tracing the position indicated by the arrow image g2 (a portion where the arrow image g2 is displayed) in the direction indicated by the arrow image g2, the terminal device T receives the operation as the movement operation and transmits the movement instruction to the vehicle V.

When the movement instruction is received from the terminal device T, for example, as shown in (b) in FIG. 6, the control device 30 of the vehicle V gradually moves (for example, moves backward) the vehicle V to the set target parking position (here, the available parking position P1).

As shown in (c) in FIG. 6, when the movement of the vehicle V to the target parking position is completed, the control device 30 transmits information indicating that the parking is completed to the terminal device T. The terminal device T that receives the information displays an operation completion screen G3 on the touch panel 103 as shown in (c) in FIG. 6. The operation completion screen G3 displays, for example, a message m3 indicating that the parking is completed.

Exiting Parking Space by Remote Parking Function

In a case of exiting from a parking space by the remote parking function, for example, when an operation to execute exiting by the remote parking function is received through the terminal device T or the like, the control device 30 of the vehicle V detects, based on a detection result of the sensor group 10, an available exit position where the vehicle V can exit. Here, the available exit position is, for example, a position to which the vehicle V can move from a parking position where the vehicle V is currently parked and is a position where the vehicle V can be temporarily parked for the user U to get in. Then, the control device 30 sets the detected available exit position as the target position (hereinafter also referred to as a "target exit position"). The control device 30 may set a position specified by the user U as the target exit position.

Thereafter, the control device 30 moves the vehicle V to the target exit position by controlling an operation of each unit of the vehicle V based on the movement instruction from the terminal device T. As described above, the movement instruction is transmitted from the terminal device T to the vehicle V when the user performs a predetermined operation on the touch panel 103 of the terminal device T where the remote parking application is executed, for example.

Figure 7:
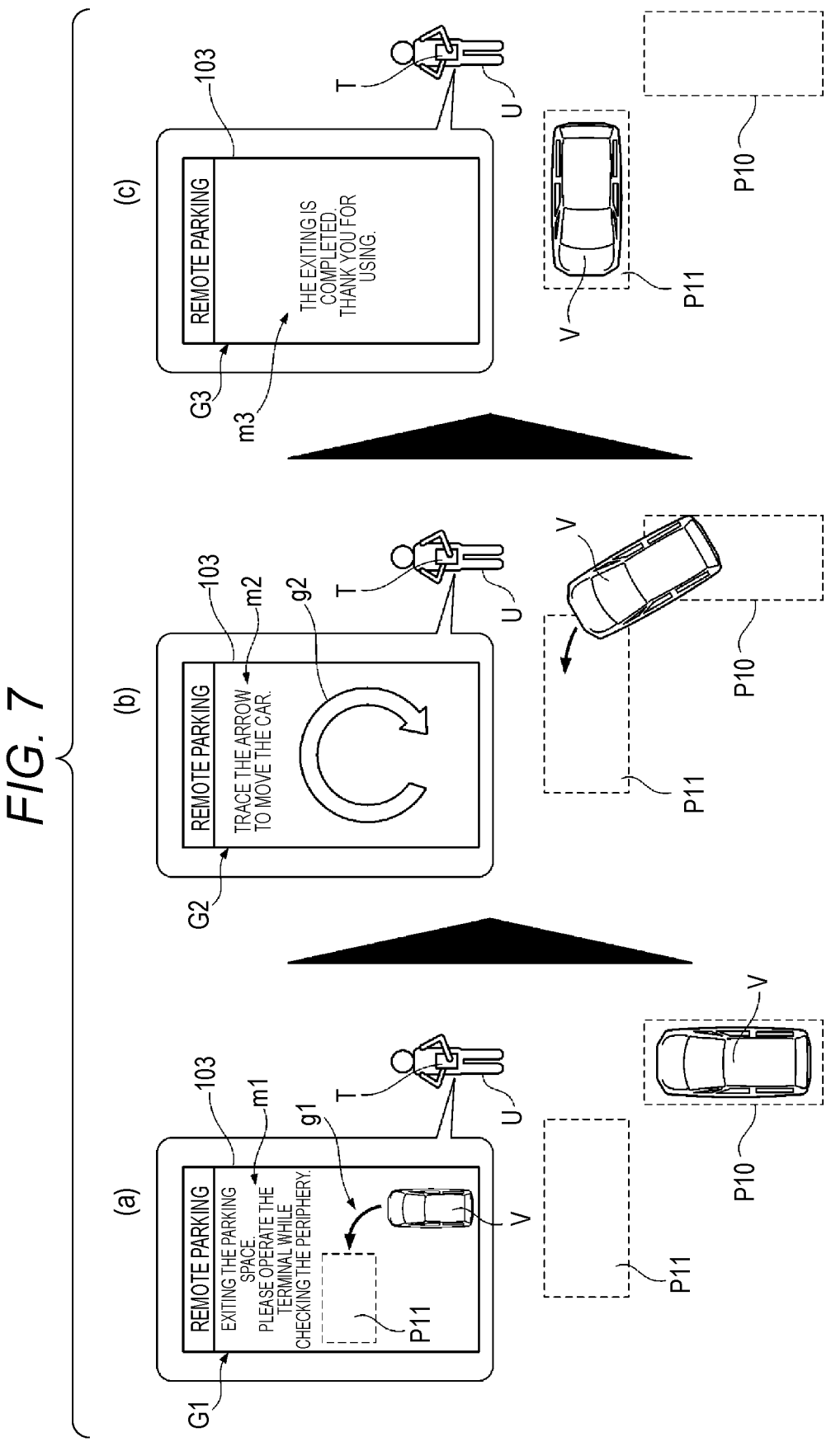
FIG. 7 shows an example of exiting a parking space using the remote parking function.

More specifically, as shown in (a) in FIG. 7, when an operation to execute exiting by the remote parking function is received from the user U, the control device 30 detects an available exit position P11 where the vehicle V can exit from a parking position P10 where the vehicle V currently parks, and sets the detected available exit position P11 as the target exit position. When setting the target exit position, the control device 30 transmits, to the terminal device T, information including a position of the target exit position and contents of movement toward the target exit position (for example, along which trajectory the movement is to be performed to exit to the target exit position).

The terminal device T displays, for example, an operation start screen G11 on the touch panel 103 based on the information received from the vehicle V. The operation start screen G11 displays an image g11 indicating a positional relationship between the vehicle V and the target exit position (here, the available exit position P11) and a trajectory when the vehicle V moves to the target exit position, and a message m11 prompting attention to the peripheral situation.

When the user U performs a predetermined operation (for example, a touch operation) on the touch panel 103 on which the operation start screen G11 is displayed, an operation reception screen G12 is displayed on the touch panel 103 as shown in (b) in FIG. 7. On the operation reception screen G12, similarly to the operation reception screen G2, for example, the arc-shaped arrow image g2 is displayed in a large size at the center of the screen, and the message m2 that guides the movement operation for moving the vehicle V is displayed beside (in this example, above) the arrow image g2. When there is an operation of tracing the position indicated by the arrow image g2 (a portion where the arrow image g2 is displayed) in the direction indicated by the arrow image g2, the terminal device T receives the operation as the movement operation and transmits the movement instruction to the vehicle V.

When the movement instruction is received from the terminal device T, for example, as shown in (b) in FIG. 7, the control device 30 of the vehicle V gradually moves (for example, moves forward) the vehicle V to the set target exit position (here, the available exit position P11).

As shown in (c) in FIG. 7, when the movement of the vehicle V to the target exit position is completed, the control device 30 transmits information indicating that the exiting is completed to the terminal device T. The terminal device T that receives the information displays an operation completion screen G13 on the touch panel 103 as shown in (c) in FIG. 7. The operation completion screen G13 displays, for example, a message m13 indicating that the exiting is completed.

As described above, for example, when the availability data newly obtained when the remote parking function is enabled indicates unavailability, the control device 30 may disable the remote parking function. However, although the availability data indicating the unavailability is obtained during the movement of the vehicle V by the remote parking function, it may not be preferable to disable the remote parking function and stop the vehicle V at that time from the viewpoint of safety.

Therefore, when the vehicle V is moved to the target position (for example, the available parking position P1 shown in FIG. 6 or the available exit position P11 shown in FIG. 7) by the remote parking function, the control device 30 may disable the remote parking function after the vehicle V reaches the target position in a case where the availability data indicating that the remote parking function is unavailable is obtained from at least one of the server SV and the terminal device T. Accordingly, even when it is determined that the user is not authorized to use the remote parking function when the vehicle V is moved by the remote parking function, the vehicle V can be moved to the target position once. Therefore, it is possible to prevent the vehicle V from stopping at an intermediate position to the target position and to prevent a decrease in safety caused by stopping the vehicle V at the intermediate position.

Processing Performed by Each Device of Vehicle Control System

Next, an example of processing performed by the terminal device T and the control device 30 of the vehicle V in the vehicle control system 1 will be described. First, an example of processing performed by the terminal device T will be described here.

Example of Processing Performed by Terminal Device

Figure 8:
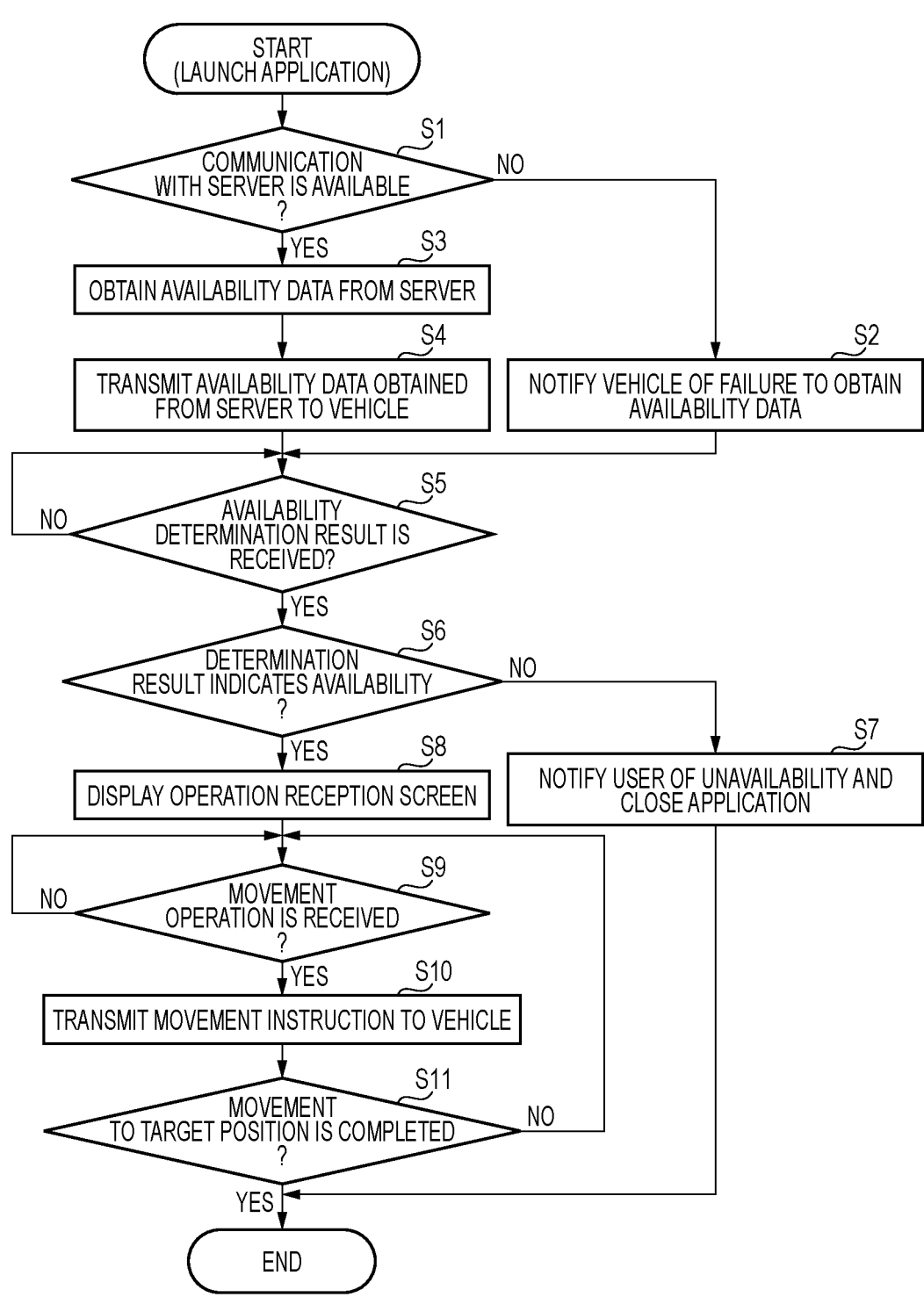
FIG. 8 is a flowchart showing an example of processing performed by the terminal device T.

For example, when the remote parking application is launched in response to a remote parking application launch command from the user, the terminal device T executes the processing shown in FIG. 8. As shown in FIG. 8, first, the terminal device T determines whether communication with the server SV via the network NET is available (step S1).

When it is determined that communication with the server SV is unavailable (step S1: NO), the terminal device T notifies the vehicle V of failure to obtain the availability data (step S2) and proceeds to processing of step S5.

When it is determined that the communication with the server SV is available (step S1: YES), the terminal device T obtains the availability data from the server SV (step S3), transmits the obtained availability data to the vehicle V (step S4), and proceeds to the processing of step S5.

Next, the terminal device T determines whether a determination result regarding availability of the remote parking function is received from the vehicle V (step S5). When it is determined that no determination result is received (step S5:

NO), the terminal device T repeats the processing of step S5 until the determination result is received.

When it is determined that the determination result is received (step S5: YES), the terminal device T determines whether the received determination result indicates availability (step S6). If the received determination result indicates unavailability (step S6: NO), the terminal device T, for example, notifies the user that the remote parking function is unavailable, ends the remote parking application (step S7), and ends the processing shown in FIG. 8. That is, in this case, the user cannot use the remote parking function of the vehicle V.

On the other hand, if the received determination result indicates availability (step S6: YES), the terminal device T displays an operation reception screen for receiving an operation from the user (for example, the operation reception screen G2 shown in FIG. 6 or the operation reception screen G12 shown in FIG. 7) on the touch panel 103 (step S8).

Next, the terminal device T determines whether a movement operation is received from the user through the operation reception screen displayed by the processing of step S8 (step S9). When it is determined that no movement operation is received (step S9: NO), the terminal device T repeats the processing of step S9 until the movement operation is received.

When it is determined that the movement operation is received (step S9: YES), the terminal device T transmits a movement instruction corresponding to the received movement operation to the vehicle V (step S10). Accordingly, the vehicle V moves a predetermined distance (for example, 0.5 [m]) toward the target position (for example, the available parking position P1 shown in FIG. 6 or the available exit position P11 shown in FIG. 7).

The terminal device T determines whether the movement of the vehicle V to the target position is completed (step S11). When it is determined that the movement of the vehicle V to the target position is not completed (step S11: NO), the terminal device T returns to the processing of step S9. On the other hand, when it is determined that the movement of the vehicle V to the target position is completed (step S11: YES), the terminal device T ends the processing shown in FIG. 8.

Example of Processing Performed by Control Device of Vehicle

Figure 9:
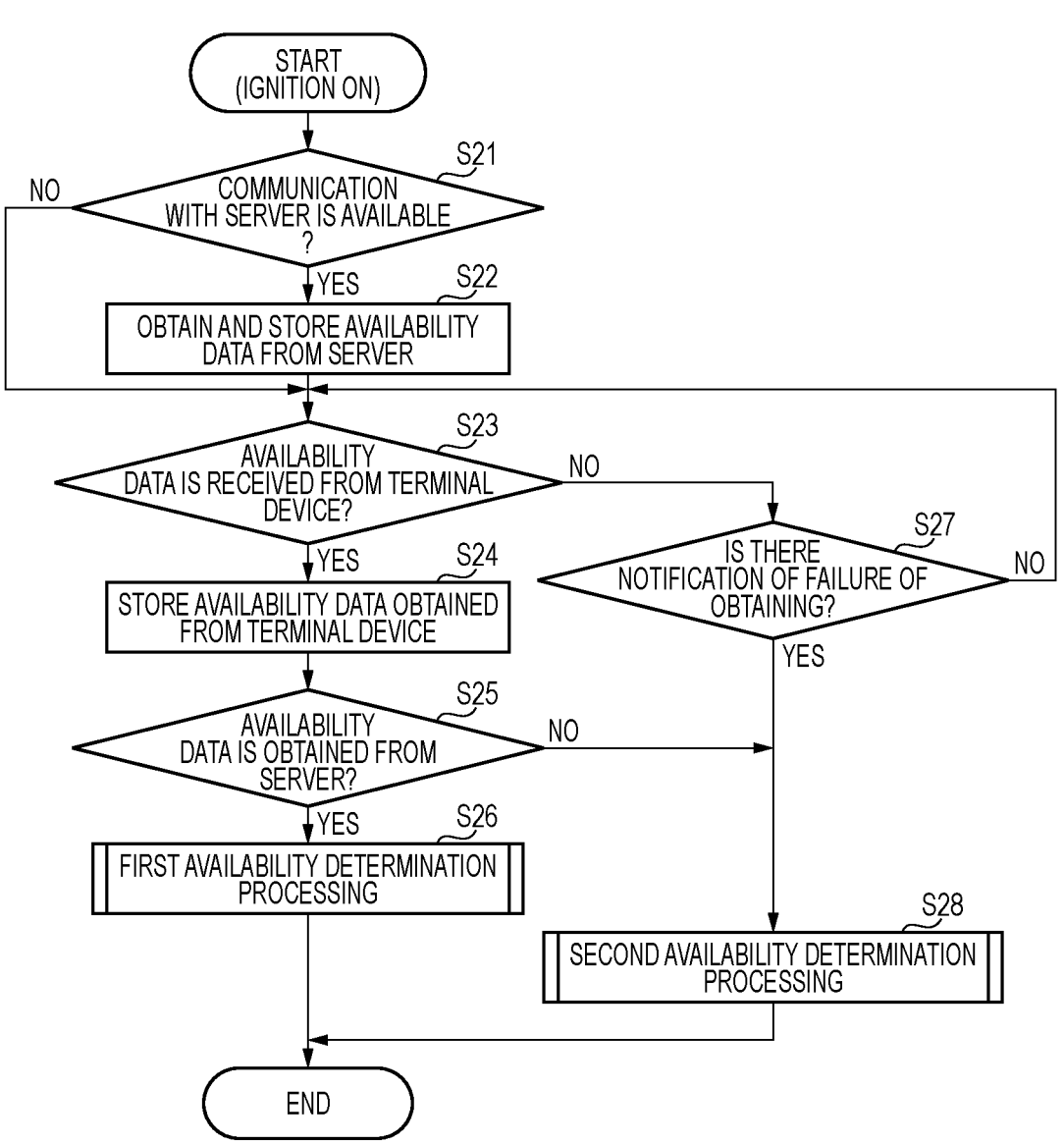
FIG. 9 is a flowchart showing an example of processing performed by the control device 30.

Next, an example of processing performed by the control device 30 will be described. For example, when the ignition power supply of the vehicle V is turned on, the control device 30 executes the processing shown in FIG. 9. As shown in FIG. 9, first, the control device 30 determines whether communication with the server SV via the network NET is available (step S21).

When it is determined that the communication with the server SV is unavailable (step S21: NO), the control device 30 determines that obtaining the availability data from the server SV fails, and directly proceeds to processing of step S23. On the other hand, when it is determined that the communication with the server SV is available (step S21: YES), the control device 30 obtains the availability data from the server SV, stores the availability data in the storage unit 32 (step S22), and proceeds to the processing of step S23.

Next, the control device 30 determines whether the availability data is received from the terminal device T (step S23). When it is determined that the availability data is received from the terminal device T (step S23: YES), the control device 30 stores the availability data obtained (in other words, received) from the terminal device T in the storage unit 32 (step S24), and proceeds to processing of step S25.

Next, the control device 30 determines whether the availability data is obtained from the server SV by the processing of step S22 (step S25). When it is determined that no availability data is obtained from the server SV (step S25: NO), that is, when the availability data is obtained from only the terminal device T, the control device 30 proceeds to processing of step S28.

On the other hand, when it is determined that the availability data can be obtained from the server SV (step S25: YES), that is, when the availability data can be obtained from both the server SV and the terminal device T, the control device 30 performs first availability determination processing (step S26) and ends the processing shown in FIG. 9.

Here, the first availability determination processing is processing of determining whether the remote parking function is available in the vehicle V based on the availability data obtained from the server SV by the processing of step S22 and the availability data obtained from the terminal device T by the processing of step S24. A specific example of the first availability determination processing will be described later with reference to FIG. 10, and thus a description thereof is omitted here.

When it is determined that no availability data is received from the terminal device T (step S23: NO), the control device 30 determines whether a notification of failure to obtain the availability data is issued from the terminal device T (step S27). When there is no notification of failure to obtain the availability data (step S27: NO), the control device 30 returns to the processing of step S23.

When there is a notification of failure to obtain the availability data (step S27: YES), that is, when obtaining the availability data from the terminal device T fails, the control device 30 performs second availability determination processing (step S28) and ends the processing shown in FIG. 9.

Here, the second availability determination processing is processing of determining whether the remote parking function is available in the vehicle V based on the availability data obtained from one of the server SV and the terminal device T or the availability data obtained from the server SV or the terminal device T in the past time. A specific example of the second availability determination processing will be described later with reference to FIGS. 11 and 12, and thus a description thereof is omitted here.

First Availability Determination Processing

Figure 10:
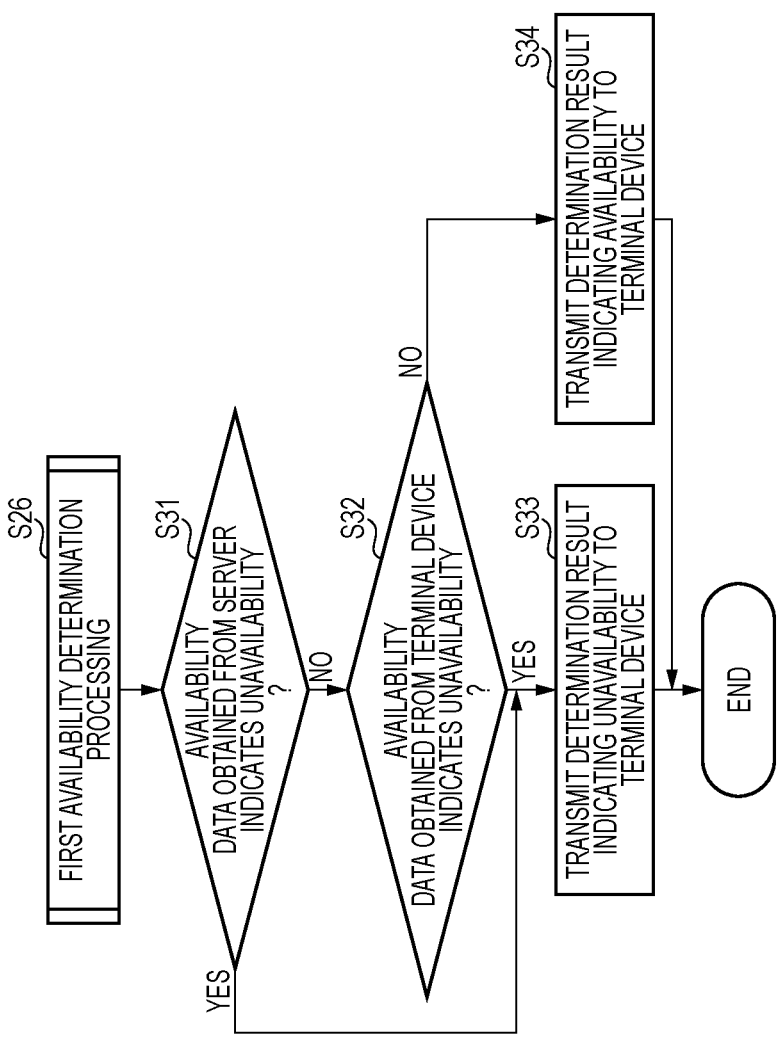
FIG. 10 is a flowchart showing an example of first availability determination processing performed by the control device 30.

Next, an example of the first availability determination processing in step S26 will be described. As shown in FIG. 10, in the first availability determination processing, the control device 30 determines whether the availability data obtained from the server SV indicates unavailability (step S31). When it is determined that the availability data obtained from the server SV indicates unavailability (step S31: YES), the control device 30 proceeds to processing of step S33.

On the other hand, when it is determined that the availability data obtained from the server SV indicates availability (step S31: NO), the control device 30 determines whether the availability data obtained from the terminal device T indicates unavailability (step S32). When it is determined that the availability data obtained from the terminal device T indicates unavailability (step S32: YES), the control device 30 transmits a determination result indicating that the remote parking function is unavailable to the terminal device T (step S33) and ends the first availability determination processing. In this way, the control device 30 transmits the determination result indicating that the remote parking function is unavailable to the terminal device T, thus the terminal device T does not display the operation reception screen described above, and the remote parking function is in an unavailable state.

On the other hand, when it is determined that the availability data obtained from the terminal device T indicates availability (step S32: NO), the control device 30 transmits a determination result indicating that the remote parking function is available to the terminal device T (step S34) and ends the first availability determination processing. In this way, the control device 30 transmits the determination result indicating that the remote parking function is available to the terminal device T, thus the terminal device T displays the operation reception screen described above, and the remote parking function is in an available state.

Second Availability Determination Processing

Figure 11:
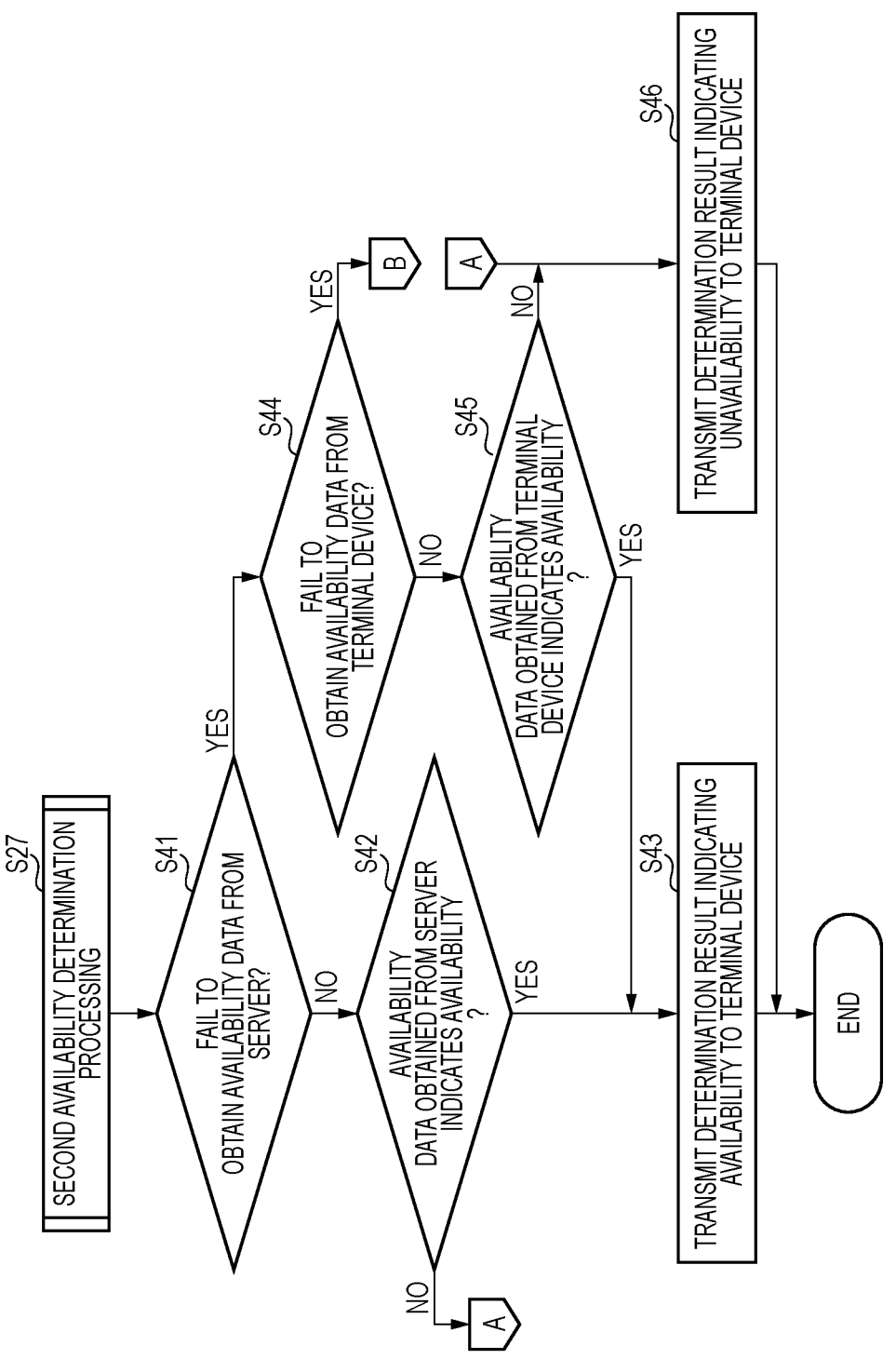
FIG. 11 is a flowchart showing an example of second availability determination processing performed by the control device 30 (part 1)
Figure 12:
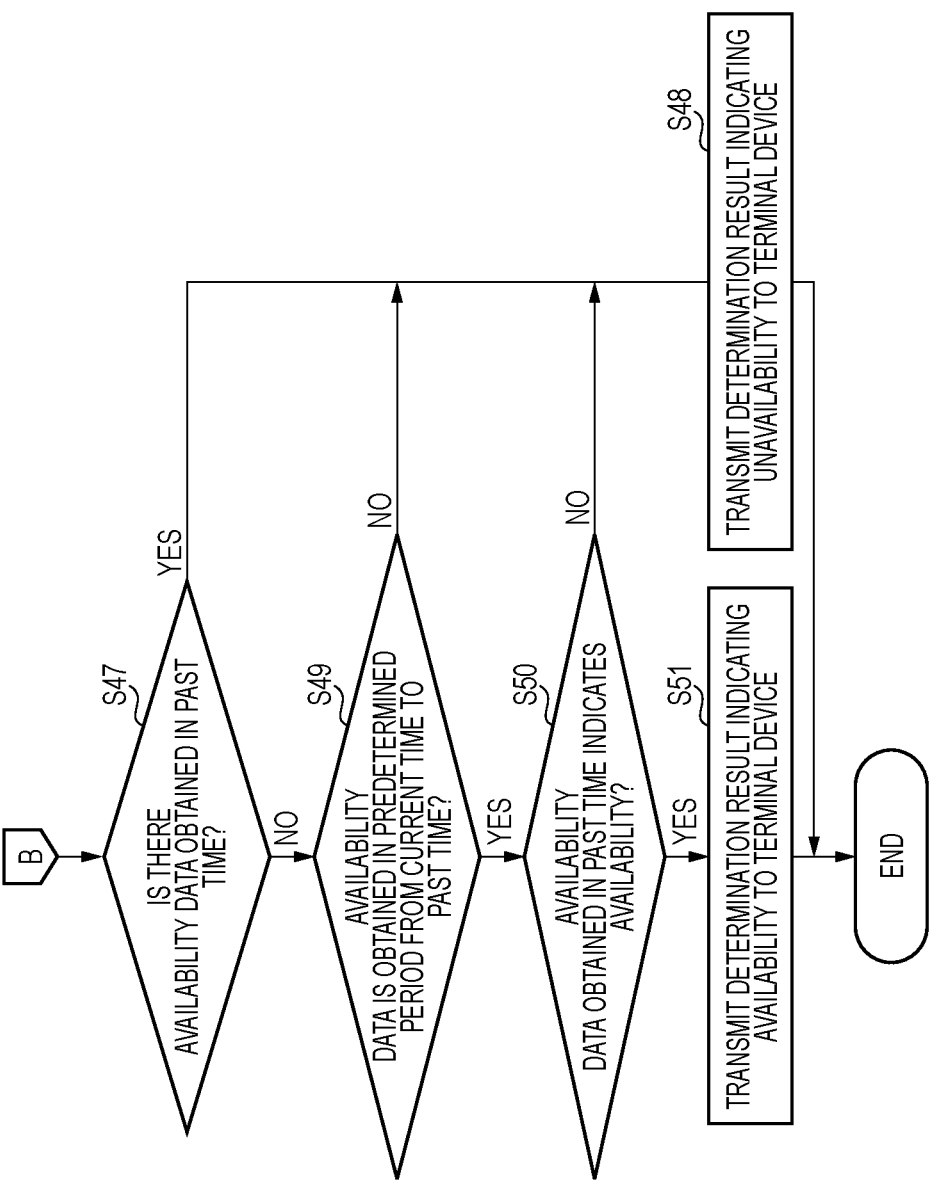
FIG. 12 is a flowchart showing the example of the second availability determination processing performed by the control device 30 (part 2).

Next, an example of the second availability determination processing in step S28 will be described. As shown in FIG. 11, in the second availability determination processing, the control device 30 determines whether obtaining the availability data from the server SV fails (step S41). When it is determined that obtaining the availability data from the server SV does not fail (step S41: NO), that is, when only obtaining the availability data from the terminal device T fails, the control device 30 determines whether the availability data obtained from the server SV indicates availability (step S42).

When it is determined that the availability data obtained from the server SV indicates unavailability (step S42: NO), the control device 30 proceeds to processing of step S46. On the other hand, when it is determined that the availability data obtained from the server SV indicates availability (step S42: YES), the control device 30 transmits a determination result indicating that the remote parking function is available to the terminal device T (step S43) and ends the second availability determination processing.

When it is determined that obtaining the availability data from the server SV fails (step S41: YES), the control device 30 determines whether obtaining the availability data from the terminal device T fails (step S44). When it is determined that obtaining the availability data from the terminal device T does not fail (step S44: NO), that is, when only obtaining the availability data from the server SV fails, the control device 30 determines whether the availability data obtained from the terminal device T indicates availability (step S45).

When it is determined that the availability data obtained from the terminal device T indicates availability (step S45: YES), the control device 30 proceeds to processing of step S43. On the other hand, when it is determined that the availability data obtained from the terminal device T indicates unavailability (step S45: NO), the control device 30 transmits a determination result indicating that the remote parking function is unavailable to the terminal device T (step S46) and ends the second availability determination processing.

When it is determined that obtaining the availability data from the terminal device T fails (step S44: YES), that is, when obtaining the availability data from both the server SV and the terminal device T fails, the control device 30 proceeds to processing of step S47 shown in FIG. 12.

The control device 30 refers to the storage unit 32 and determines whether there is any availability data obtained in the past time (step S47). When it is determined that there is no availability data obtained in the past time (step S47: NO), the control device 30 transmits a determination result indicating that the remote parking function is unavailable to the terminal device T (step S48) and ends the second availability determination processing.

On the other hand, when it is determined that there is availability data obtained in the past time (step S47: Yes), the control device 30 determines whether the availability data is obtained in the predetermined period from the current time to the past time (step S49). As an example, in the processing of step S49, the control device 30 determines that there is availability data obtained in the predetermined period from the current time to the past time when there is availability data obtained in a period from the current time to one month before. As another example, in the processing of step S49, the control device 30 may determine whether the number of times of parking or exiting using the remote parking function performed from most recent obtaining of the availability data to the current time is equal to or smaller than a predetermined number (for example, five times), and may determine that there is availability data obtained in the predetermined period from the current time to the past time when the number of times is equal to or smaller than the predetermined number. That is, the predetermined period may be a certain period such as one month, or may be defined using the number of times of parking or exiting using the remote parking function.

When it is determined that the availability data in the past time is obtained in the predetermined period from the current time to the past time (step S49: YES), the control device 30 determines whether the availability data indicates availability (step S50). When it is determined that the availability data obtained in the past time indicates unavailability (step S50: NO), the control device 30 proceeds to the processing of step S48. On the other hand, when it is determined that the availability data obtained in the past time indicates availability (step S50: YES), the control device 30 transmits a determination result indicating that the remote parking function is available to the terminal device T (step S51) and ends the second availability determination processing.

As described above, according to the present embodiment, it is possible to improve the convenience for the user of the vehicle V having a predetermined function such as the remote parking function. Further, it is possible to improve traffic safety and contribute to development of a sustainable transportation system.

The control method described in the present embodiment can be implemented by a computer executing a program (control program) prepared in advance. The control program is stored in, for example, a computer-readable storage medium and executed by being read from the storage medium. The control program may be provided in a form stored in a non-volatile (non-transitory) storage medium such as a flash memory, or may be provided via a network such as the Internet. In the present embodiment, the computer that executes the control program is the control device 30 of the vehicle V, but the computer is not limited thereto. For example, the computer that executes the control program may be provided in the terminal device T that is communicable with the vehicle V (for example, the CPU constituting the control unit 101).

Although the embodiment of the present disclosure has been described above with reference to the accompanying drawings, it is needless to say that the present disclosure is not limited to the embodiment. It is apparent to those skilled in the art that various modifications or alterations can be conceived within the scope described in the claims, and it is understood that the modifications or alterations naturally fall within the technical scope of the invention. In addition, the constituent elements in the above-described embodiment may be combined as desired without departing from the gist of the invention.

For example, in the above-described embodiment, an example in which the control device according to the present disclosure is implemented by the control device 30 provided in the vehicle V is described, but the control device is not limited thereto. For example, the control device according to the present disclosure may be implemented by the terminal device T. In this case, for example, the terminal device T (control unit 101) may execute each piece of processing executed by the control device 30 (control unit 33) described above.

In the above-described embodiment, an example in which the predetermined function in the present disclosure is the remote parking function is described, but the predetermined function is not limited thereto. The predetermined function in the present disclosure may be any function other than the remote parking function, and may be, for example, an adaptive cruise control function that causes the vehicle V to travel in a manner of following a preceding vehicle by automatically adjusting the travel speed or the like of the vehicle V, or a lane keep assist function that prevents deviation of the vehicle V from a lane. The predetermined function in the present disclosure may be a function other than a driving assistance function, and may be, for example, a function enabling reproduction of a video, music, or a game in a so-called subscription format.

In the embodiment described above, an example in which the moving body in the present disclosure is the vehicle V that is a four-wheel automobile is described, but the moving body is not limited thereto. The moving body in the present disclosure may also be a two-wheeled automobile (so-called motorcycle), a Segway (registered trademark), a ship, or an aircraft.

In this specification, at least the following matters are described. Although corresponding constituent elements and the like in the above-described embodiment are shown in parentheses, the present disclosure is not limited thereto.

(1) A control device (control device 30) that controls a vehicle (vehicle V) having a predetermined function, in which the control device is configured to obtain, via a network (network NET), data on availability of the predetermined function of the vehicle from a server (server SV) that stores the data, and obtain the data, which is obtained from the server by a terminal device (terminal device T) of a user of the vehicle, from the terminal device, and includes a control unit (control unit 33) configured to determine, when obtaining the data from one of the server and the terminal device fails, whether the predetermined function is available based on the data obtained from the other one of the server and the terminal device, and enable the predetermined function when it is determined that the predetermined function is available.

According to (1), even when the control device fails to obtain data from one of the server and the terminal device, it is possible to make the predetermined function of the vehicle available (in other words, enable the function) based on the data obtained from the other one of the server and the terminal device. Accordingly, it is possible to prevent the predetermined function of the vehicle from being unusable by the user for whom the function is originally available due to failure to obtain the data from one of the server and the terminal device, and thus convenience for the user is improved. This further contributes to development of a sustainable transportation system.

(2) The control device according to (1), in which the control unit determines that the predetermined function is available when the data obtained from the other one of the server and the terminal device includes information indicating that the predetermined function is available.

According to (2), it is possible to provide the predetermined function of the vehicle to the user for whom the function is originally available.

(3) The control device according to (1) or (2), in which when obtaining the data from both the server and the terminal device fails, the control unit further determines whether the predetermined function is available based on the data obtained from the server or the terminal device in a past time.

According to (3), even when the control device fails to obtain data from both the server and the terminal device, the predetermined function of the vehicle can be available based on the data obtained in the past time. Accordingly, it is possible to prevent the predetermined function of the vehicle from being unusable by the user for whom the function is originally available due to failure to obtain the data from both the server and the terminal device, and thus the convenience for the user is improved.

(4) The control device according to (3), in which the control unit determines that the predetermined function is available when the data obtained in the past time includes information indicating that the predetermined function is available.

According to (4), it is possible to provide the predetermined function of the vehicle to the user for whom the function is originally available.

(5) The control device according to (3) or (4), in which the data obtained in the past time is the data obtained in a predetermined period between a current time and the past time.

Whether the user is authorized to use the predetermined function of the vehicle may change over time. According to (5), it is possible to prevent failure to provide the predetermined function to the user for whom the predetermined function of the vehicle is originally available and prevent the predetermined function from being erroneously provided to the user for whom the predetermined function is originally unavailable based on outdated data.

(6) The control device according to any one of (3) to (5), in which the data obtained in the past time is the data obtained most recently.

According to (6), it is possible to prevent failure to provide the predetermined function to the user for whom the predetermined function of the vehicle is originally available and prevent the predetermined function from being erroneously provided to the user for whom the predetermined function is originally unavailable based on outdated data.

(7) The control device according to any one of (1) to (6), in which the predetermined function is a function of moving the vehicle to a predetermined position in response to an operation on the terminal device.

According to (7), it is possible to provide the highly convenient function of moving the vehicle to the predetermined position according to the operation on the terminal device to the user for whom the function is available.

(8) The control device according to (7), in which the control unit further disables the predetermined function after the vehicle reaches the predetermined position, in a case where the data including information indicating that the predetermined function is unavailable is obtained from at least one of the server and the terminal device while the vehicle is moved to the predetermined position by the predetermined function.

According to (8), the vehicle can be moved to the predetermined position even when it is determined that the predetermined function is originally unavailable for the user when the vehicle is moved to the target position by the predetermined function. Accordingly, it is possible to prevent the vehicle from stopping at an intermediate position and to prevent a decrease in safety caused by stopping the vehicle at the intermediate position.

(9) The control device according to any one of (1) to (8), in which the server is configured to store the data in which information indicating availability of the predetermined function of the vehicle is associated with an identifier for identifying the vehicle, the user, or the terminal device, and the server is configured to store the data including the information indicating that the predetermined function is available based on a user's billing operation on the vehicle or the terminal device.

According to (9), it is possible to provide the highly convenient function of moving the vehicle to the predetermined position according to the operation on the terminal device to the user who performs the billing operation.

(10) A control method performed by a computer (control device 30) that controls a vehicle having a predetermined function, in which the computer is configured to obtain, via a network (network NET), data on availability of the predetermined function of the vehicle from a server (server SV) that stores the data, and obtain the data, which is obtained from the server by a terminal device (terminal device T) of a user of the vehicle, from the terminal device, and the control method includes causing the computer to determine, when obtaining the data from one of the server and the terminal device fails, whether the predetermined function is available based on the data obtained from the other one of the server and the terminal device, and enable the predetermined function when it is determined that the predetermined function is available.

According to (10), even when the control device fails to obtain data from one of the server and the terminal device, it is possible to make the predetermined function of the vehicle available (in other words, enable the function) based on the data obtained from the other one of the server and the terminal device. Accordingly, it is possible to prevent the predetermined function of the vehicle from being unusable by the user for whom the function is originally available due to failure to obtain the data from one of the server and the terminal device, and thus the convenience for the user is improved. This further contributes to development of a sustainable transportation system.

The invention claimed is:
1. A control device that controls a vehicle having a predetermined first function, wherein the control device is configured to obtain, via a network, data on availability of the first function of the vehicle from each of a server that stores the data and a terminal device of a user of the vehicle, and the control device comprises a control unit configured to:

determine, when obtaining the data by communication from one of the server and the terminal device fails, whether the first function is available based on the data obtained from an other one of the server and the terminal device; and enable the first function when it is determined that the first function is available.

2. The control device according to claim 1, wherein the control unit determines that the first function is available when the data obtained from the other one of the server and the terminal device includes information indicating that the first function is available.

3. The control device according to claim 1, wherein when obtaining the data from both the server and the terminal device fails, the control unit further determines whether the first function is available based on the data obtained from the server or the terminal device in a past time.

4. The control device according to claim 3, wherein the control unit determines that the first function is available when the data obtained in the past time includes information indicating that the first function is available.

5. The control device according to claim 3, wherein the data obtained in the past time is the data obtained in a predetermined period between a current time and the past time.

6. The control device according to claim 3, wherein the data obtained in the past time is the data obtained most recently.

7. The control device according to claim 1, wherein the first function is a function of moving the vehicle to a predetermined position in response to an operation on the terminal device from the user outside the vehicle.

8. The control device according to claim 7, wherein the control unit further disables the first function after the vehicle reaches the predetermined position, in a case where the data including information indicating that the first function is unavailable is obtained from at least one of the server and the terminal device while the vehicle is moved to the predetermined position by the first function.

9. The control device according to claim 7, wherein the server is configured to store the data in which information indicating availability of the first function of the vehicle is associated with an identifier for identifying the vehicle, the user, or the terminal device, and the server is configured to store the data including the information indicating that the first function is available based on a user's billing operation on the vehicle or the terminal device.

10. A control method performed by a computer that controls a vehicle having a first function, wherein the computer is configured to obtain, via a network, data on availability of the first function of the vehicle from each of a server that stores the data and a terminal device of a user of the vehicle, and the control method comprises:

determining, when obtaining the data by communication from one of the server and the terminal device fails, whether the first function is available based on the data obtained from an other one of the server and the terminal device; and enabling the first function when it is determined that the first function is available.

11. The control device according to claim 1, wherein the control unit determines whether the first function is available or not based on the data obtained from the server, when obtaining the data from the terminal device fails.

12. A control device that controls a vehicle having a predetermined first function, wherein the control device is configured to obtain, via a network, data on availability of the first function of the vehicle from each of a server that stores the data and a terminal device of a user of the vehicle, and the control device comprises a control unit configured to:

determine that the first function is unavailable when the data from one of the server and the terminal device includes information indicating that the first function is unavailable and the data from an other of the server and the terminal device includes information indicating that the first function is available, or determine whether the first function is available based on the data that was obtained at a later date and time; and enable the first function when it is determined that the first function is available.

* * * * *